Patented July 27, 1948

2,445,951

UNITED STATES PATENT OFFICE 2,445,951

METHOD OF PRODUCING WELDED JOINTS

Theodore E. Kihlgren, Scotch Plains, and Charles E. Lacy, Westfield, N. J., assignors to The International Nickel Company, Inc., New York, N. Y., a corporation of Delaware No Drawing. Application December 26, 1946, Serial No. 718,620. In Canada October 25, 1946

12 Claims. (Cl. 219—8)

1

The present invention relates to the welding of high nickel alloys, and it relates more particularly to a method and means for producing ductile, single and multiple bead welds essentially free of hot cracking tendencies.

The present invention is a continuation-in-part of our co-pending application, U. S. Serial No. 602,498, filed June 30, 1945, now U. S. Patent No. 2,422,489, and particularly with respect to the method and the welded structure free of weld hot cracking. In our aforesaid co-pending application, we have shown that weld hot cracking tendencies encountered in welding high nickel content nickel-chromium-iron alloys containing from 0.1 to 10% iron, 75 to 85% nickel, and 10 to 20% chromium with welding elements of like composition are directly related to the silicon content of the fusion aspect, the hot cracking tendency being greater, the greater the amount of silicon present. We have further shown therein that this deleterious effect of the silicon in the fusion is substantially overcome by introducing columbium into the welding element in an amount sufficient to maintain in the fusion deposit a columbium to silicon ratio of at least 4.5 to 1.

We have now discovered that the effect of silicon in promoting weld hot cracking in nickel-chromium-iron alloys extends to considerably higher iron contents and lower nickel contents, at comparable chromium levels, than were disclosed in the above-mentioned application, and that weld hot cracking can be eliminated in these alloys of lower nickel content also by incorporating in the fusion deposit suitable amounts of columbium. We have further discovered that the critical columbium to silicon ratio required in the fusion to eliminate hot cracking in nickel-chromium-iron alloys containing at least about 0.15% silicon, is not constant but varies inversely with the nickel content or directly with the iron content. Stated otherwise, we have discovered that a higher columbium-silicon ratio is required in the fusion metal uniting parts of such alloys when the nickel content of such parts is relatively low

2 and the iron content proportionately high than is required when the nickel content of such parts is relatively high and the iron content proportionately low, and, when in each case, the fusion metal is otherwise of substantially the same nickel-chromium-iron composition as that of the parts united by the fusion metal.

It is an object of the present invention to provide a welded joint between adjacent parts in which the parts and the fusion metal therebetween are of substantially the same composition as regards the nickel-chromium-iron content thereof and in which said fusion metal also contains columbium and silicon in a columbium-silicon ratio varying inversely with a decrease in iron content.

It is another object of the present invention to provide a welded joint between adjacent pieces of similar composition of nickel-chromium-iron alloys, said joint being substantially devoid of hot cracking.

A further object of the present invention is the provision of welding electrodes containing columbium and silicon in such definite and predetermined relationship to each other and to the nickel and iron content of said electrode that welds made therefrom will have columbium and silicon in a ratio exceeding a certain minimum value.

It is a still further object of the present invention to provide a method for producing welded joints in nickel-chromium-iron alloys which are capable of meeting free bend requirements.

Other objects and advantages will become apparent from the following disclosure.

In our earlier application, to which reference has been made hereinbefore, we have shown that, when welding nickel-chromium-iron alloys such as those sold under the trade mark "Inconel," weld hot cracking is eliminated when the fusion metal uniting plates or parts of such an alloy is of substantially the same composition as that of the parts and in addition contains columbium and silicon in a columbium-silicon ratio of at least 4.5 to 1. It was also shown that the method is effective in preventing weld hot cracking in nickel-chromium alloys such as those known as the "80-20" type, the nominal analysis of which is set forth hereinafter.

We have now extended our investigation of the causes of weld hot cracking and the means by which such cracking may be eliminated to a wider range of nickel-chromium-iron alloys, especially such alloys containing less than 75% nickel and as low as 30% nickel. It has been found during these further investigations that the critical columbium to silicon ratio required to eliminate weld hot cracking in all nickel-chromium-iron alloys studied is not constant but increases as the nickel content is decreased, with a corresponding increase in the iron content. In general, this discovery is applicable to weld joints comprised of a fusion deposit containing about 0.1% to 50% iron, 10% to 20% chromium and 30% to 80% nickel, to a method of producing such weld joints, and to welding electrodes containing the aforesaid amounts of iron, chromium and nickel, especially when the nickel content is less than 75%. The critical columbium-silicon ratio that must be provided in the fusion deposit has been found to vary from a minimum of about 3.8 to 1 for a weld joint containing 80% nickel (and 0.1% iron) to a minimum of about 8 to 1 for a weld joint containing about 30% nickel (and 50% iron) at essentially comparable chromium levels. This relationship between the minimum columbium-silicon ratio and the nickel (or iron) content is applicable to fusion deposits containing at least about 0.15% silicon, e. g., 0.2% to 1.75%. The minimum columbium content is determined by the silicon content (and the required minimum ratio) and the columbium content may be as high as 8% or even higher, but any substantial excess over the ratio (over and above the small excess that may be required as a safety factor) increases the cost with no particular additional advantage insofar as freedom from hot cracking in the weld is concerned.

The aforesaid ratios of columbium to silicon which must be attained or exceeded have been established by making a series of "X-weld crack tests" with varying contents of columbium and silicon. The X-weld crack test is made by forming a weld in which two 3-inch lengths or blocks of 1-inch square bar stock are joined along a 3-inch edge with a double V-groove weld. The weld passes are laid in, two at a time, at alternate sides of the double V formed by the two blocks with sufficient time lapse between each pair of passes to permit the specimen to cool to below 100° F. During welding, visual examination is made of each pass after it has been laid in to determine whether any gross cracking has occured. After welding, the specimen is sectioned twice on planes perpendicular to the direction of welding, and the sectional surfaces of the weld are polished on a rubber-bonded, fine abrasive wheel, etched, and examined under a binocular microscope for cracks.

In the illustrative X-weld tests set forth hereinafter, electrodes having core wires made of various alloys were used, including core wires made of alloys having the following nominal compositions:

| Alloy | Ni, per cent | Cr, per cent | Fe, per cent | C, per cent | Si, per cent | Mn, per cent | Cb, per cent |
|---|---|---|---|---|---|---|---|
| "80–20" | Bal. | 20 | 0.1–0.5 | 0.05–0.15 | 1 0.15–1.30 | 0.1–0.7 |  |
| 60–15 | 60 | 15 | Bal. | 0.1 | 0.4 | 0.5 |  |
| 60–15+Cb | 60 | 15 | Bal. | 0.1 | 0.4 | 0.5 | 2 |
| 35–15 | 35 | 15 | Bal. | 0.15 | 0.4 | 1.0 |  |
| 35–15+Cb | 35 | 15 | Bal. | 0.15 | 0.4 | 1.0 | 2 |

1 See Table 6.

The nominal composition of some of the alloys of the test pieces or blocks employed in the illustrative tests are as follows:

| Alloy | Ni, per cent | Cr, per cent | Fe, per cent | C, per cent | Si, per cent | Mn, per cent |
|---|---|---|---|---|---|---|
| "80–20" | Bal. | 20 | 0.1 | 0.06 | 0.25 | 0.4 |
| 60–15 | 60 | 15 | Bal. | 0.1 | 0.4 | 0.5 |
| 35–15 | 35 | 15 | Bal. | 0.15 | 0.4 | 1.0 |

In the production of welded joints in accordance with the invention, weld crack tests were made employing electrode cores of the alloy set forth hereinbefore containing about 60% nickel, 15% chromium, and the balance mainly iron with X-weld blocks of similar composition; also with electrode cores made of the alloy containing 35% nickel, 15% chromium, balance mainly iron in conjunction with X-weld blocks of similar composition; and further with electrodes of the "80–20" composition with X-weld blocks of corresponding composition.

The results of these tests are given in the following tables, showing the effects on weld hot cracking of varied columbium to silicon ratios.

X-weld crack tests of joints made of an alloy containing about 60% nickel, 15% chromium, and balance mainly iron, and having the nominal composition set forth hereinbefore, were made and the results of these X-weld tests are reported in Table 1. Therein, the X-weld blocks were of similar nickel, chromium and iron content, and the analyses given are those of the weld deposit.

Table 1.—*60% nickel–15% chromium*

| Weld No. | Columbium Content, Per Cent | Silicon Content, Per Cent | Cb-Si Ratio | Observation of cracking in sectioned weld |
|---|---|---|---|---|
| 1 | 0 | 0.44 | 0–0.44 | Medium. |
| 2 | 1.60 | 0.55 | 2.91–1 | Do. |
| 3 | 2.92 | 0.87 | 3.35–1 | Severe. |
| 4 | 1.50 | 0.42 | 3.57–1 | Medium. |
| 5 | 4.22 | 1.11 | 3.80–1 | Do. |
| 6 | 3.01 | 0.59 | 5.10–1 | Do. |
| 7 | 2.85 | 0.45 | 6.33–1 | Do. |
| 8 | 4.57 | 0.68 | 6.72–1 | Slight. |
| 9 | 4.27 | 0.60 | 7.12–1 | None. |
| 10 | 6.30 | 0.80 | 7.88–1 | Do. |

The flux coated electrodes used for the welds of Table 1 are shown in accompanying Table 2. It will be understood that, in each test, the core wire composition as to nickel, chromium and iron content corresponds to that of the metal members joined therewith.

Table 2.—Electrodes

| Weld No. | Core Wire | Flux Composition, Parts | | | | | | Dextrine Flux Binder, Parts |
|---|---|---|---|---|---|---|---|---|
| | | CaCO₃ | CaF₂ | FeTi [1] | FeCb | FeSi | Bent. | |
| 1 | 60-15 | 52 | 30 | 15 | | | 3 | 3 |
| 2 | 60-15+Cb(2%) | 52 | 30 | 15 | | | 3 | 3 |
| 3 | 60-15 | 41 | 25 | 6 | 20 | 5 | 3 | 3 |
| 4 | 60-15 | 48 | 29 | 10 | 10 | | 3 | 3 |
| 5 | 60-15+Cb(2%) | 41 | 25 | 6 | 20 | 5 | 3 | 3 |
| 6 | 60-15+Cb(2%) | 48 | 29 | 10 | 10 | | 3 | 3 |
| 7 | 60-15 | 44 | 27 | 6 | 20 | | 3 | 3 |
| 8 | 60-15 | 39 | 23 | 5 | 30 | | 3 | 3 |
| 9 | 60-15+Cb(2%) | 44 | 27 | 6 | 20 | | 3 | 3 |
| 10 | 60-15+Cb(2%) | 39 | 23 | 5 | 30 | | 3 | 3 |

[1] Ferro-titanium containing about 40% titanium used.

All core wires 0.156" diameter.
All flux coatings 0.230" outside diameter.
Current used for all welds 120 amperes D. C.
Bent.=Bentonite.

As will be noted in the instance of welds Nos. 3, 4, 7 and 8, the columbium is introduced entirely from the flux coatings whereas, in the instance of weld No. 2, it is introduced by the core wire content, and, in the instance of welds Nos. 5, 6, 9 and 10, by the columbium inclusion in the electrode cores and coatings as indicated.

The results of X-weld crack tests employing weld bars or blocks and electrode cores of alloys containing about 35% nickel, 15% chromium, and balance mainly iron are shown in Table 3 and are identified as test welds Nos. 11 to 22. As before, the electrode cores and the test block correspond in nickel, chromium and iron contents, and the data as to the coated electrodes are given in Table 4.

Table 3.—35% nickel–15% chromium

| Weld No. | Columbium Content, Per Cent | Silicon Content, Per Cent | Cb-Si Ratio | Observation of cracking in sectioned weld |
|---|---|---|---|---|
| 11 | 0 | 0.90 | 0-0.90 | Severe. |
| 12 | 0 | 0.51 | 0-0.51 | Do. |
| 13 | 1.23 | 0.54 | 2.28-1 | Medium. |
| 14 | 2.88 | 1.11 | 2.59-1 | Severe. |
| 15 | 1.68 | 0.52 | 3.23-1 | Medium. |
| 16 | 4.12 | 1.17 | 3.52-1 | Do. |
| 17 | 3.26 | 0.82 | 3.97-1 | Severe. |
| 18 | 2.44 | 0.54 | 4.52-1 | Medium. |
| 19 | 2.90 | 0.52 | 5.58-1 | Severe. |
| 20 | 4.65 | 0.71 | 6.55-1 | Medium. |
| 21 | 4.37 | 0.56 | 7.80-1 | Do. |
| 22 | 6.28 | 0.79 | 7.95-1 | None. |

The results of X-weld crack tests with electrode cores of the "80–20" alloys composition and with X-weld blocks of corresponding composition are given in the following Table 5 showing the effects on weld hot cracking of varied columbium-silicon ratios, the columbium having been introduced to the weld by inclusion in the flux coating on the core wire. The analyses given in Table 5 are those of the weld deposit.

Table 5.—"80–20" nickel-chromium

| Weld No. | Columbium Content, Per Cent | Silicon Content, Per Cent | Cb-Si Ratio | Observation of cracking in sectioned weld |
|---|---|---|---|---|
| 23 | 0 | 1.28 | 0-1.28 | Severe. |
| 24 | 1.60 | 1.17 | 1.37-1 | Medium. |
| 25 | 2.53 | 1.21 | 2.09-1 | Severe. |
| 26 | 2.77 | 1.14 | 2.43-1 | Do. |
| 27 | 0 | 0.28 | 0-0.28 | Slight. |
| 28 | 4.99 | 1.36 | 3.67-1 | Do. |
| 29 | 2.84 | 0.74 | 3.84-1 | None. |
| 30 | 1.37 | 0.28 | 4.89-1 | Do. |
| 31 | 2.86 | 0.58 | 4.93-1 | Do. |
| 32 | 2.34 | 0.36 | 6.50-1 | Do. |
| 33 | 3.16 | 0.43 | 7.35-1 | Do. |
| 34 | 2.91 | 0.34 | 8.56-1 | Do. |
| 35 | 4.44 | 0.50 | 8.88-1 | Do. |

The flux coated electrodes used for the welds of Table 5 are shown in Table 6.

Table 4.—Electrodes

| Weld No. | Core Wire | Flux Composition, Parts | | | | | | Dextrine Flux Binder, Parts |
|---|---|---|---|---|---|---|---|---|
| | | CaCO₃ | FeTi | CaF₂ | FeCb | FeSi | Bent. | |
| 11 | 35-15 | 46 | [2] 25 | 25 | | 3 | 4 | 3 |
| 12 | 35-15 | 52 | [1] 15 | 30 | | | 3 | 3 |
| 13 | 35-15+Cb (2%) | 52 | [1] 15 | 30 | | | 3 | 3 |
| 14 | 35-15 | 41 | [1] 6 | 25 | 20 | 5 | 3 | 3 |
| 15 | 35-15 | 48 | [1] 10 | 29 | 10 | | 3 | 3 |
| 16 | 35-15+Cb (2%) | 41 | [1] 6 | 25 | 20 | 5 | 3 | 3 |
| 17 | 35-15 | 42 | [2] 10 | 25 | 20 | 3 | 3 | 3 |
| 18 | 35-15+Cb (2%) | 48 | [1] 10 | 29 | 10 | | 3 | 3 |
| 19 | 35-15 | 44 | [1] 6 | 27 | 20 | | 3 | 3 |
| 20 | 35-15 | 39 | [1] 5 | 23 | 30 | | 3 | 3 |
| 21 | 35-15+Cb (2%) | 44 | [1] 6 | 27 | 20 | | 3 | 3 |
| 22 | 35-15+Cb (2%) | 39 | [1] 5 | 23 | 30 | | 3 | 3 |

[1] Ferro-titanium containing about 40% titanium used.
[2] Ferro-titanium containing about 25% titanium used.

All core wires 0.156" diameter.
All flux coatings 0.230" outside diameter.
Current used for all welds 120 amperes D. C.
Bent.=Bentonite.

Table 6.—Electrodes

| Weld No. | Core Wire | Flux Composition, Parts | | | | | | Dextrine Flux Binder, Parts |
|---|---|---|---|---|---|---|---|---|
| | | CaCO₃ | CaF₂ | FeTi | FeCb | FeSi | Bentonite | |
| 23 | C | 52 | 30 | ²15 | | | 3 | 3 |
| 24 | C | 48 | 29 | ²10 | 10 | | 3 | 3 |
| 25 | C | 42 | 25 | ²10 | 20 | | 3 | 3 |
| 26 | C | 42 | 25 | ²10 | 20 | | 3 | 3 |
| 27 | A | 52 | 30 | ²15 | | | 3 | 3 |
| 28 | C | 39 | 23 | ²5 | 30 | | 3 | 3 |
| 29 | A | 42 | 25 | ¹10 | 20 | 5 | 3 | 3 |
| 30 | A | 48 | 29 | ¹10 | 10 | | 3 | 3 |
| 31 | A | 42 | 25 | ¹10 | 20 | 2.5 | 3 | 3 |
| 32 | A | 42 | 25 | ¹10 | 20 | | 3 | 3 |
| 33 | B | 42 | 25 | ¹10 | 20 | | 3 | 3 |
| 34 | A | 42 | 25 | ¹10 | 20 | | 3 | 3 |
| 35 | A | 39 | 23 | ²5 | 30 | | 3 | 3 |

¹ Ferro-titanium containing about 25% titanium used.
² Ferro-titanium containing about 40% titanium used.

Core wire A: 0.156″ diam.; "80-20" Ni-Cr with 0.16% silicon.
Core wire B: 0.125″ diam.; "80-20" Ni-Cr with 0.32% silicon.
Core wire C: 0.156″ diam.; "80-20" Ni-Cr with 1.30% silicon.
Core wires A & C: flux coatings 0.230″ outside diameter; current used for welds 120 amperes D. C.
Core wire B: flux coating 0.190″ outside diameter; current used for weld 105 amperes D. C.

It will be seen from the foregoing data that, when a coated welding electrode having a core wire made of an "80-20" nickel-chromium alloy containing minor amounts of other elements, including silicon and iron, is used to unite metal parts having the same composition by a fusion deposit of the welding electrode between said parts, the weld deposit is devoid of hot cracking if columbium is introduced into the fusion in sufficient amount to provide in the fusion a columbium to silicon ratio greater than 3.8–1.

The data set forth herein demonstrate that weld hot cracking in all these alloys can be eliminated by the maintenance of a suitable minimum columbium-silicon ratio in the fusion. Further, the critical minimum ratio which must be exceeded to prevent cracking is not the same for all weld joints but increases as the iron content of the weld joint is increased with the given chromium level. For the three weld joints, for which data has been presented hereinbefore, the ratios are as follows:

| Composition | Ratio |
|---|---|
| "80-20" | at least 3.8–1. |
| 65-15 | at least 7–1. |
| 35-15 | at least 7.9–1. |

For a weld joint made of an alloy containing about 80% nickel, 14% chromium and 6% iron, referred to in said earlier application, the minimum effective columbium-silicon ratio is about 4.5 to 1.

The results of X-weld tests of weld joints employing weld bars and electrode cores of an alloy containing about 80% nickel, 14% chromium and 6% iron disclosed in said earlier application are given in Table 7.

Table 7.—80% nickel–14% chromium

| Weld No. | Columbium Content, Per Cent | Silicon Content, Per Cent | Cb-Si Ratio | Observation of cracking in sectioned weld |
|---|---|---|---|---|
| 36 | 0 | 1.39 | 0-1.39 | Severe. |
| 37 | 2.89 | 1.62 | 1.78-1 | Do. |
| 38 | 2.63 | 1.25 | 2.10-1 | Do. |
| 39 | 0 | 0.42 | 0-.42 | Medium. |
| 40 | 3.91 | 1.80 | 2.17-1 | Do. |
| 41 | 1.40 | 0.59 | 2.37-1 | Do. |
| 42 | 2.75 | 1.14 | 2.41-1 | Do. |

Table 7.—80% nickel–14% chromium—Con.

| Weld No. | Columbium Content, Per Cent | Silicon Content, Per Cent | Cb-Si Ratio | Observation of cracking in sectioned Weld |
|---|---|---|---|---|
| 43 | 4.24 | 1.37 | 3.09-1 | Slight. |
| 44 | 3.29 | 0.80 | 4.11-1 | Do. |
| 45 | 4.70 | 1.04 | 4.52-1 | None. |
| 46 | 1.54 | 0.31 | 4.97-1 | Do. |
| 47 | 2.94 | 0.55 | 5.34-1 | Do. |
| 48 | 2.65 | 0.46 | 5.77-1 | Do. |
| 49 | 4.16 | 0.66 | 6.30-1 | Do. |
| 50 | 3.09 | 0.33 | 9.36-1 | Do. |
| 51 | 3.00 | 0.26 | 11.53-1 | Do. |

As specified in said earlier application, the electrode core wires employed contained, in addition to 75 to 85% nickel, 10 to 16% chromium and 4 to 10% iron, about 0.01 to 0.2% carbon, 0.05 to 1.0% manganese, 0.05 to 0.7% silicon, and 0.05 to 1.0% copper. The composition of the flux coatings employed therewith conformed with the preferred composition given in the following Table 8 which also sets forth the range of ingredients that can be employed when ferro–25% titanium is used.

Table 8

| Flux Coating | Preferred | Range |
|---|---|---|
| Dry Ingredients: | | |
| Percent calcium carbonate | 42.0 | 37–47 |
| Percent calcium fluoride | 25.0 | 20–30 |
| Percent ferro-25% titanium | 10.0 | 5–20 |
| Percent ferro-50% columbium | 20.0 | 0–30 |
| Percent Bentonite (hydrated aluminum silicate) | 3.0 | 2–5 |
| | 100.0 | |
| Binder: Percent dextrine | 3.0 | 1–5 |

Improvement in the welds as to hot cracking tendencies is noted with relation to the columbium addition and increase in its ratio to that of the silicon content up to a definite columbium to silicon ratio in the given alloy which results in elimination or correction of the hot cracking tendency. This is evidenced by the lower ratio results of the welds giving medium and slight cracking, and the final elimination of the cracking of welds Nos. 29 to 35 of Table 5 of the "80-20" nickel-chromium alloys with columbium to silicon ratios of 3.84 to 1 and higher. It is also evident from the test results that in the instance of the welds made of alloys containing about 60% nickel, 15% chromium and the balance mainly iron (Table 1) elimination of hot cracking occurs at a ratio of 7.12 to 1 (weld No. 9) and that in the instance of welds made of an alloy containing about 35% nickel, 15% chromium and the balance mainly iron, hot cracking is eliminated at a columbium to silicon ratio of 7.95 to 1 as shown by reference to weld No. 22 of Table 3. A comparison of the welds numbered 29, 9 and 22 applied to welding with the "80-20" nickel-chromium alloy; the alloy containing about 60% nickel, 15% chromium and the balance mainly iron; and the alloy containing about 35% nickel, 15% chromium and the balance mainly iron, respectively, (and also the welds of the alloy containing about 80% nickel, 14% chromium and the balance mainly iron of the co-pending application), shows that a higher columbium to silicon ratio is required in the fusion metal uniting parts of such alloys when the nickel content is relatively low and the iron content is proportionately higher.

As further support of the principle that the required columbium to silicon ratio increases as the nickel decreases and/or the iron content increases, attention is directed to the results of weld No. 9 (Table 1) considered with relation to weld No. 21 (Table 3). It will be observed that in the weld No. 9 of the 60% nickel-15% chromium alloy, a columbium to silicon ratio of 7.12 to 1 resulted in elimination of hot cracking whereas the higher ratio (of columbium to silicon) of 7.80 to 1 in the 35% nickel-15% chromium alloy produced medium hot cracking tendencies and elimination of hot cracking was accomplished in that alloy weld deposit only on increasing the columbium to silicon ratio to a value of 7.95 to 1 (weld No. 22 of the lower-nickel alloy).

The data obtained as a result of the weld joint tests referred to have definitely established that weld hot cracking encountered in weld deposits of nickel-chromium-iron alloys which are normally malleable can be traced to the composition of the fusion metal and that by suitable compositional adjustments, the hot cracking tendencies can be largely eliminated. More specifically, it has been found that silicon promotes hot cracking and that its effect can be neutralized by the presence of suitable amounts of columbium. Furthermore, it has been found that there is a direct relationship between the silicon content of the fusion and the columbium content required to eliminate weld hot cracking and that the critical columbium to silicon ratio required to prevent cracking in weld joints is not the same for all alloys used but generally tends to increase, at a substantially comparable chromium level, as the iron content of the alloys is increased.

While the welds referred to herein have been performed by manual arc process, it will be understood that the principle developed for controlling the weld cracking in nickel-chromium-iron alloys is equally applicable to other welding processes for the elimination of the hot cracking tendencies.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the appended claims.

We claim:

1. In the method of producing welded joints between adjacent members made of nickel-chromium-iron alloys containing about 30% to 80% nickel, about 10% to 20% chromium, and the balance mainly iron with a welding element of similar composition containing at least 0.15% silicon, the improvement which comprises incorporating in said welding element a columbium content up to 8%, controlling the content of columbium to provide a critical minimum ratio of columbium to silicon in a fusion deposit made by the welding element, the ratio of columbium to silicon in said fusion deposit being so proportioned to the iron content thereof that the minimum ratio with 0.1% iron is about 3.84 to 1, the minimum ratio with 50% iron is about 8 to 1, and the minimum ratio with intermediate amounts of iron is between said values and is higher as the iron content increases in said range, whereby welded joints substantially devoid of hot cracks are produced.

2. In the method of producing welded joints between adjacent members made of nickel-chromium-iron alloys containing about 30% to 80% nickel, about 10% to 20% chromium, and the balance mainly iron with a welding element of composition within said ranges and containing at least 0.15% silicon, the improvement which comprises incorporating in said welding element a columbium content up to 8%, controlling the content of columbium to provide a critical minimum ratio of columbium to silicon in a fusion deposit made by the welding element, the ratio of columbium to silicon in said fusion deposit being so proportioned to the iron content thereof that the minimum ratio with 0.1% iron is about 3.84 to 1, the minimum ratio with 50% iron is about 8 to 1, and the minimum ratio with intermediate amounts of iron is between said values but is higher as the iron content increases in said range, whereby welded joints substantially devoid of hot cracks are produced.

3. In the method of producing welded joints, the improvement which comprises uniting adjacent members made of nickel-chromium-iron alloys containing about 30% to about 80% nickel, about 10% to about 20% chromium, and the balance mainly iron by a fusion deposit from a welding element of substantially similar composition having a silicon content of at least 0.15% and a columbium content up to about 8%, the ratio of columbium to silicon in said fusion deposit being in a range of about 3.84 to 1 to at least about 8 to 1 whereby welded joints substantially devoid of hot cracks are produced.

4. In the method of producing welded joints, the improvement which comprises uniting adjacent members made of nickel-chromium-iron alloys containing about 30% to about 80% nickel, about 10% to about 20% chromium, and the balance mainly iron by a fusion deposit of substantially similar composition having a silicon content of at least 0.15% and a columbium content up to about 8% made by a welding element, said welding element having an amount of columbium and silicon such that the minimum ratio of columbium to silicon in said fusion deposit is in a range of at least about 3.84 to 1 to at least about 8 to 1, the higher the iron content the higher the minimum ratio between the limits of said range, whereby welded joints substantially devoid of hot cracks are produced.

5. In the method of producing welded joints, the improvement which comprises uniting adjacent members made of nickel-chromium-iron alloys containing about 30% to about 80% nickel, about 10% to about 20% chromium, and the balance mainly iron by a fusion deposit from a welding element of substantially similar composition having a silicon content of at least 0.15% and a columbium content up to about 8%, the ratio of columbium to silicon in said fusion deposit being about 8 to 1, whereby welded joints substantially devoid of hot cracks are produced.

6. In the method of producing welded joints, the improvement which comprises uniting adjacent members made of nickel-chromium-iron alloys containing about 30% to about 80% nickel, about 10% to about 20% chromium, and the balance mainly iron by a fusion deposit of substantially similar composition having a silicon content of at least 0.15% and a columbium content up to about 8% made by a coated electrode, said electrode coating having an amount of columbium such that the minimum ratio of columbium to silicon in said fusion deposit is in a range of at least about 3.84 to 1 to at least about 8 to 1, the higher the iron content the higher the minimum ratio between the limits of said range, whereby welded joints substantially devoid of hot cracks are produced.

7. In the method of producing welded joints, the improvement which comprises uniting adjacent members made of nickel-chromium-iron alloys containing about 30% to about 80% nickel, about 10% to about 20% chromium, and the balance mainly iron by a fusion deposit from a coated electrode having a core of a composition within the range given and having a silicon content of at least 0.15% and a columbium content up to about 8%, the ratio of columbium to silicon in said fusion deposit being within the range of about 3.84 to 1 and at least about 8 to 1, and wherein at least part of said columbium is introduced to the fusion deposit from the electrode core, whereby welded joints substantially devoid of hot cracks are produced.

8. In the method of producing welded joints, the improvement which comprises uniting adjacent members made of nickel-chromium-iron alloys containing about 30% to about 80% nickel, about 10% to about 20% chromium, and the balance mainly iron by a fusion deposit from a coated electrode having a core of a composition within the range given and having a silicon content of at least 0.15% and a columbium content up to about 8%, the ratio of columbium to silicon in said fusion deposit being within the range of about 3.84 to 1 and at least about 8 to 1, and wherein at least part of the said columbium is introduced to the fusion deposit from a flux coating, whereby welded joints substantially devoid of hot cracks are produced.

9. A welding electrode adapted for forming weld deposits substantially devoid of hot cracks comprising a core wire containing nickel from about 30% to less than 75%, chromium from about 10% to 20% and the balance mainly iron including at least about 0.15% silicon and a flux coating enclosing said core wire, said electrode containing columbium in such quantity and in such form that the residual columbium content in the weld deposit will be at least 3.84 times the content of silicon in said deposit for the lower iron content alloy and at least about 8 times the silicon content of the deposit for the higher iron content alloy.

10. A welding electrode adapted for forming weld deposits substantially devoid of hot cracks comprising a core wire containing nickel from about 30% to less than 75%, chromium from about 10% to 20% and the balance mainly iron including at least about 0.15% silicon and a flux coating enclosing said core wire, said electrode core containing columbium in such quantity and in such form that the residual columbium content in the weld deposit will be within a range of at least 3.84 times the content of silicon in said deposit for the lower iron content alloy to at least about 8 times the silicon content of the deposit for the higher iron content alloy.

11. A welding electrode adapted for forming weld deposits substantially devoid of hot cracks comprising a core wire containing nickel from about 30% to less than 75%, chromium from about 10% to 20% and the balance mainly iron including at least about 0.15% silicon and a flux coating enclosing said core wire, said electrode coating containing columbium in such quantity and in such form that the residual columbium content in the weld deposit will be within a range of at least 3.84 times the content of silicon in said deposit for the lower iron content alloy to at least about 8 times the silicon content of the deposit for the higher iron content alloy.

12. A welding electrode adapted for forming weld deposits substantially devoid of hot cracks comprising a core wire containing at least 30% but less than 75% nickel, about 10% to 20% chromium, at least 0.15% to 1.75% silicon and the balance mainly iron and a flux coating enclosing said core wire, said electrode containing columbium and silicon in such quantity and in such form as to provide a minimum columbium to silicon ratio in the weld deposit made thereby, the ratio of columbium to silicon being so proportioned to the iron content that the minimum ratio with 0.1% iron is about 3.84 to 1, the minimum ratio with 50% iron is about 8 to 1, and the minimum ratio with intermediate amounts of iron is between said values and is higher as the iron content increases in said range.

THEODORE E. KIHLGREN.
CHARLES E. LACY.

REFERENCES CITED

The following references are of record in the file of this patent:

UNITED STATES PATENTS

| Number | Name | Date |
|---|---|---|
| 1,954,296 | Keir | Apr. 10, 1934 |
| 2,306,421 | Arness | Dec. 29, 1942 |